(12) United States Patent
Sellers et al.

(10) Patent No.: US 10,500,529 B2
(45) Date of Patent: Dec. 10, 2019

(54) MODULAR FILTER ASSEMBLY

(71) Applicant: Stonehouse Water Technologies, LLC, Milwaukee, WI (US)

(72) Inventors: Mark G Sellers, Nashotah, WI (US); Brian P Conrad, Belgium, WI (US); Hensley Foster, Germantown, WI (US); Moe Mukiibi, Milwaukee, WI (US)

(73) Assignee: Stonehouse Water Technologies, LLC, Milwaukee, WI (US)

( * ) Notice: Subject to any disclaimer, the term of this patent is extended or adjusted under 35 U.S.C. 154(b) by 0 days.

(21) Appl. No.: 15/924,862

(22) Filed: Mar. 19, 2018

(65) Prior Publication Data
US 2019/0282939 A1  Sep. 19, 2019

Related U.S. Application Data

(60) Provisional application No. 62/545,254, filed on Aug. 14, 2017.

(51) Int. Cl.
*B01D 35/30* (2006.01)
*C02F 1/00* (2006.01)
*B01D 29/00* (2006.01)
*B01D 24/04* (2006.01)

(52) U.S. Cl.
CPC ......... *B01D 35/303* (2013.01); *B01D 24/047* (2013.01); *B01D 29/0047* (2013.01); *C02F 1/004* (2013.01); *B01D 2201/302* (2013.01); *B01D 2317/06* (2013.01)

(58) Field of Classification Search
None
See application file for complete search history.

(56) References Cited

U.S. PATENT DOCUMENTS

| | | | | |
|---|---|---|---|---|
| 4,637,874 A | * | 1/1987 | Ansteth | B01D 35/303 210/232 |
| 2008/0185323 A1 | * | 8/2008 | Kargenian | B01D 69/10 210/117 |
| 2016/0144301 A1 | * | 5/2016 | Tadlock | B01D 29/52 210/234 |
| 2017/0348639 A1 | * | 12/2017 | Mizoguchi | B01D 61/30 |

* cited by examiner

*Primary Examiner* — Chester T Barry
(74) *Attorney, Agent, or Firm* — Andrus Intellectual Property Law, LLP

(57) ABSTRACT

A fluid filter assembly that is defined by a head portion, a base portion, and a filter tube housing that is captured therebetween. Each head portion includes more than one fluid inlet and more than one fluid outlet that are oriented relative to the respective head portion such that a plurality of fluid filter assemblies can be fluidly connected to one another to provide a desired degree of filtration of the fluid passed therethrough and such that the fluid filter assemblies can be oriented in a plurality of orientations relative to one another to provide a desired configuration of the fluid filter assembly.

20 Claims, 13 Drawing Sheets

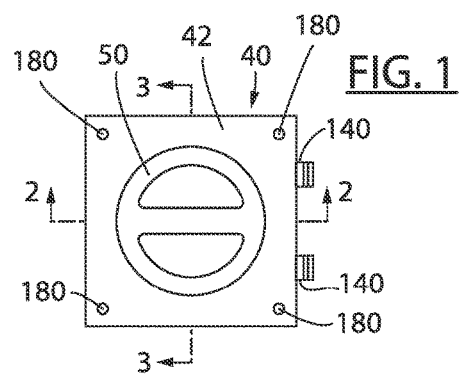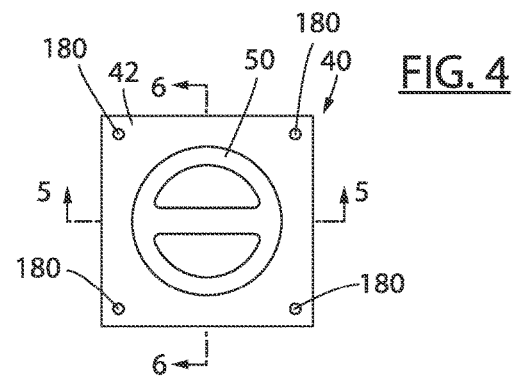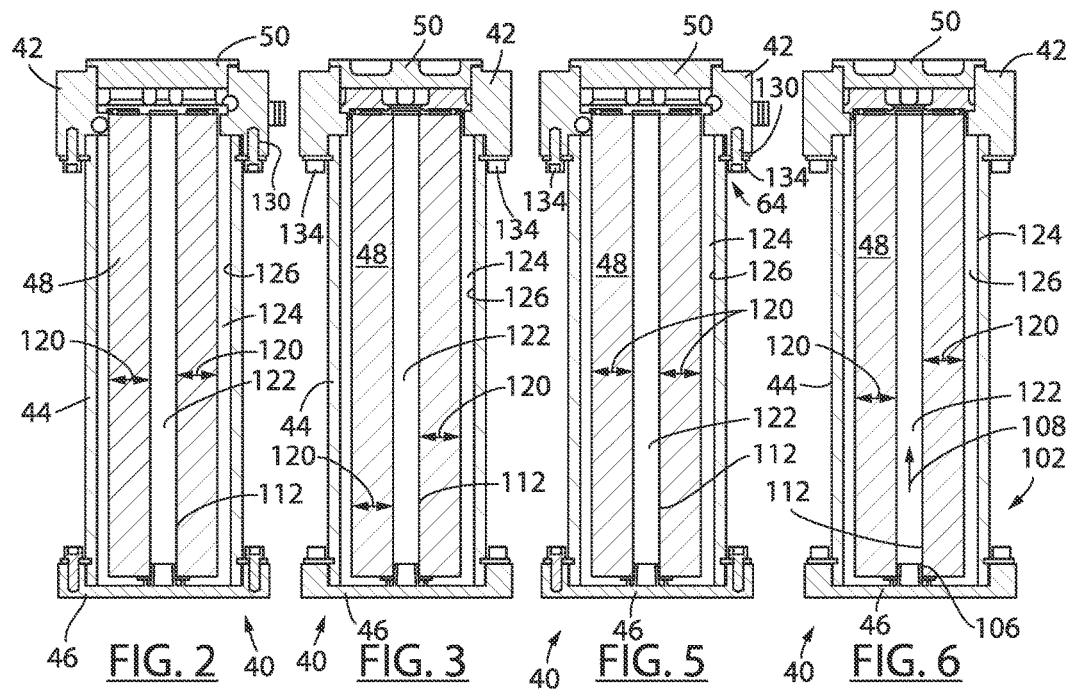

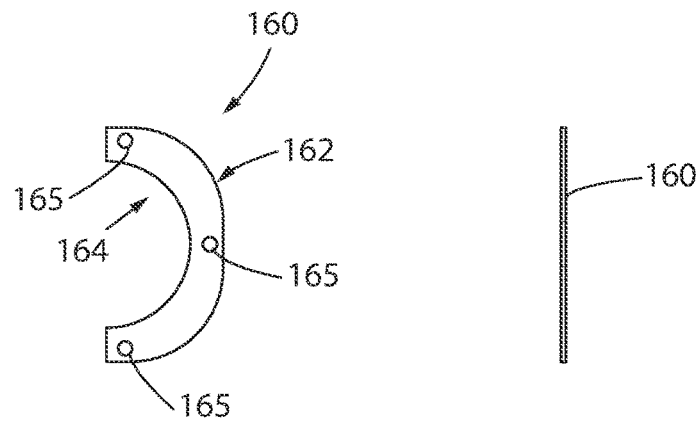
FIG. 26  FIG. 27
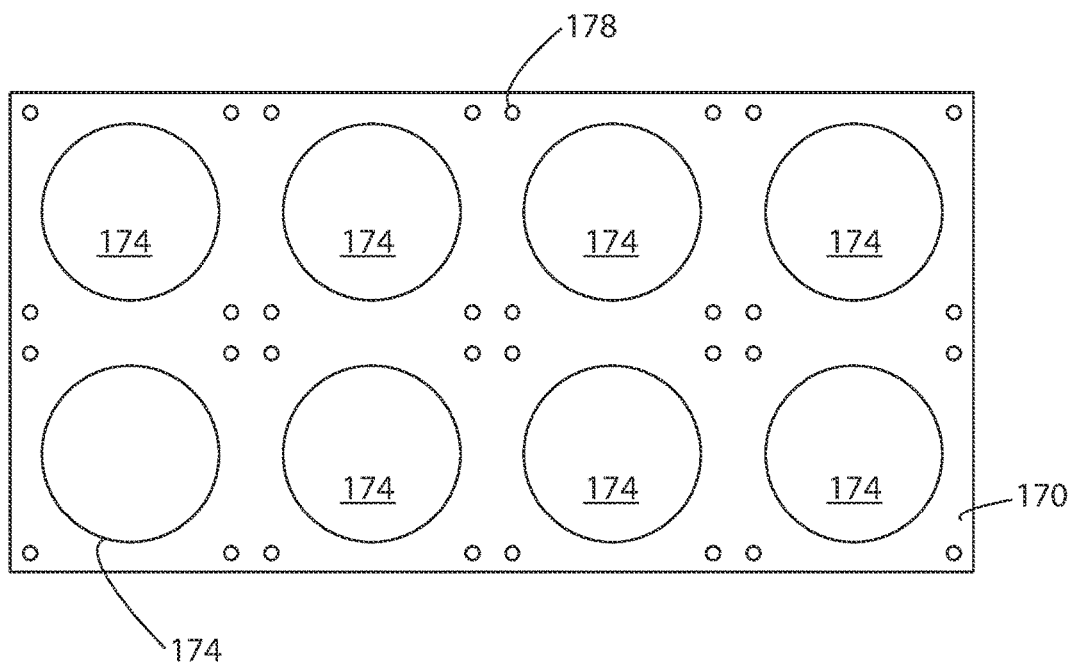
FIG. 28
FIG. 29

MODULAR FILTER ASSEMBLY

BACKGROUND OF THE INVENTION

The present invention relates to filtering assemblies, and in particular, to a modular filter assembly that is constructed to fluidly cooperate with one another such that a desired number of filter housings can be operationally connected to one another to provide a desired degree of filtration of the fluid flow passed therethrough.

Filtration of fluid flows is desirable across a litany of industries and has applicability in both commercial and residential environments and enterprises. Merely by way of example, a common fluid flow associated with many commercial and residential applications is the flow of water from a source, via a municipal source such as a water tower, or a rural source such as a discrete or single residence well. Understandably, the degree of filtration associated with such fluid flows is largely contingent upon the characteristics of the incoming fluid flow, the intended purpose associated with use of the fluid, and the volumes of fluid intended to be filtered. It is appreciated that some commercial, industrial, or residential activities may have less stringent filtration requirements for certain activities, such as for vehicle or equipment washing or non-potable applications, such as crop or lawn watering or the like, and more stringent filtration demands, such as for chemical mixings, potable water uses, etc. Understandably, the degree of filtration necessary to achieve a desired clarity or condition of such water fluid flows will be largely affected by the quality or condition of the incoming fluid flows as well as the volumetric fluid flow demands.

Regardless of the intended use or application, it should be further appreciated that the filtration demands associated with any fluid flow are infrequently provided in a steady-state condition. That is, it is appreciated that the condition of the incoming flow may change as a function of time as may the desires or intended use associated with consumption or use of the same. Unfortunately, many filtration systems are provided in a fixed form factor wherein the degree of filtration associated with the given flows offers only a very limited degree of manipulation associated with installation and operation of the respective filtration systems. Commonly, the only degree of adjustability associated with the previously configured filtration system is the replacement of the filtration media and/or omission of the same during use of the filtration system as the conditions associated with the incoming flow or demand associated with use of the same change. Such concerns can unduly increase the cost associated with the manufacture and installation of the discrete filtration systems and/or the costs associated with operation and maintenance of the same.

Although the examples provided above generally relate to filtrations associated with water fluid flows, it is appreciated that such filtration systems have applicability associated with filtration of other fluid flows. Commonly, such filtration systems include one or more replaceable or interchangeable filter media that are each configured to remove or otherwise capture particulate matter, chemical elements such as iron or the like, and/or biological compounds. The conditions associated with the discrete fluid flow source as well as the desired condition of the resultant filtered fluid flow renders many filtration systems ill-suited for applicability with more than a discrete set of fluid flow conditions. As such, users are customarily left with the limited option of purchasing, servicing and maintaining greater filtration capability than is necessary or tolerating poorer filtration performance than is desired.

Accordingly, there is a need for a filtration system or filter assembly that provides a compact form factor and can be expeditiously configured to satisfy the demands of unique application specific filtration needs. There is a further need for a filter assembly that can be individually tailored to specific filtration needs and does so in a manner that provides improved uniformity or improved interchangeability between the discrete structures associated with forming a desired filter assembly.

SUMMARY OF THE INVENTION

The present invention provides a modular fluid filtration system or filter assembly that overcomes one or more of the drawbacks discussed above. Each fluid filter assembly is defined by a head portion, a base portion, and a filter tube housing that is captured between a respective head portion and respective base portion. Each head portion includes more than one fluid inlet and more than one fluid outlet that are discretely oriented relative to the respective head portion such that a plurality of fluid filter assemblies can be fluidly connected to one another to provide a desired degree of filtration of fluid passed through the filter assembly and such that the fluid filter assemblies can be oriented in a plurality of orientations relative to one another to provide a desired configuration of the fluid filter assembly.

One aspect of the invention discloses a filter assembly that includes a base, a filter tube housing, and a top housing. The filter tube housing has a lower end that is sealingly engaged with the base and an upper end that is offset from the first end and cooperates with the top housing. The top housing sealingly cooperates with the upper end of the filter tube housing and defines a first fluid inlet, a second fluid inlet, a first fluid outlet, and a second fluid outlet. The first fluid inlet, the second fluid inlet, the first fluid outlet, and the second fluid outlet are oriented to be selectively fluidly connected to a respective one of a first fluid inlet, a second fluid inlet, a first fluid outlet, and a second fluid outlet defined by another top housing connected to the filter assembly such that multiple fluid filter assemblies can be connected to one another in more than one configuration and effectuate gradual filtering of the fluid passed therethrough.

Another aspect of the application discloses a filter assembly that includes or is combinable with one or more of the features or aspects disclosed above. The filter assembly includes a first filter housing assembly that includes a head portion, a base portion, and a tube housing that is disposed between the head portion and the base portion. A second filter housing assembly having the same construction as the first filter housing assembly is connectable to the first filter housing to effectuate fluid connectivity between a head portion of the second filter housing assembly and the head portion of the first filter housing assembly at more than one orientation of the first head portion relative to the second head portion.

A further aspect of the application that is combinable with one or more of the aspects or features disclosed above includes a method of forming a fluid filter assembly. The method includes providing a filter housing assembly that defines a filter chamber and includes at least two fluid inlets and at least two fluid outlets. A mount plate is provided and constructed to secure a plurality of the filter housing assemblies relative to one another in a manner that directs a flow of a fluid through the filter housing assemblies when the filter housing assemblies are connected to one another in more than one relative position.

These various aspects, features, and advantages may apply to only some embodiments falling within the claims and thus do not define the scope of the invention.

BRIEF DESCRIPTION OF THE DRAWINGS

FIG. 1 is a top plan view of a filter assembly according to the present invention;

FIG. 2 is a cross section elevation view of the filter assembly taken along line 2-2 shown in FIG. 1;

FIG. 3 is a view similar to FIG. 2 taken along line 3-3 shown in FIG. 1;

FIG. 4 is a view similar to FIG. 1 of the filter assembly with the fluid flow connectors removed therefrom;

FIG. 5 is a cross section elevation view of the filter assembly taken along line 5-5 shown in FIG. 4;

FIG. 6 is a view similar to FIG. 5 of the filter assembly taken along line 6-6 shown in FIG. 4;

FIGS. 26 and 27 are various views of an upper and lower clamp plate that removable cooperates with a discrete one of the filter assemblies shown in FIGS. 1-6;

FIGS. 28 and 29 are various views of an upper mount plate that removably cooperates with a plurality of the filter assemblies shown in FIGS. 1-6;

Figure 7:
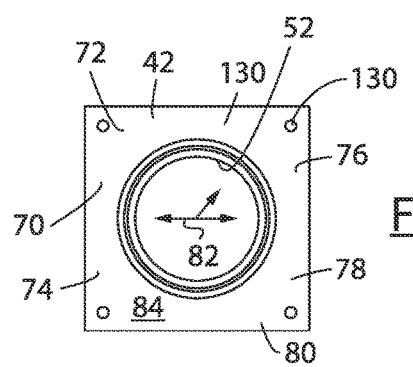
FIGS. 7-13 are various views of a top housing of the filter assembly shown in FIGS. 1-6.
Figure 8:
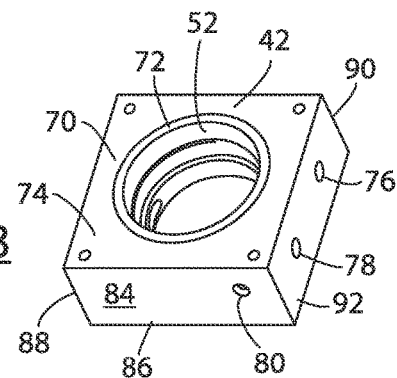
Figure 9:
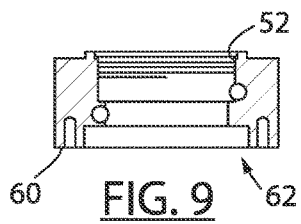
Figure 12:
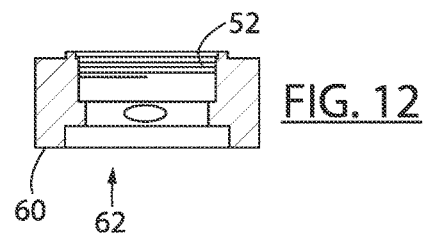
Figure 10:
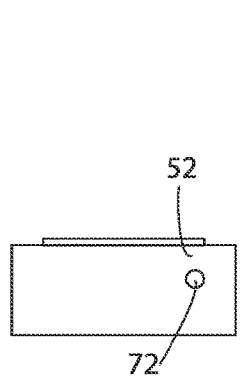
Figure 11:
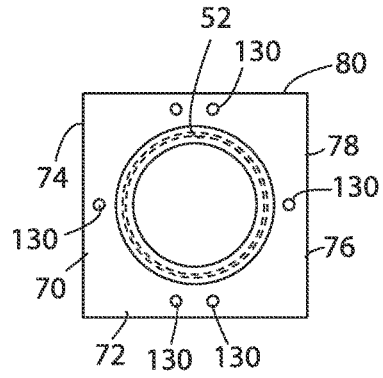
Figure 13:
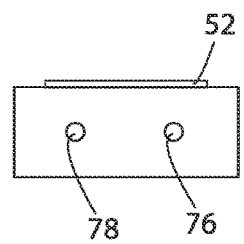
Figure 14:
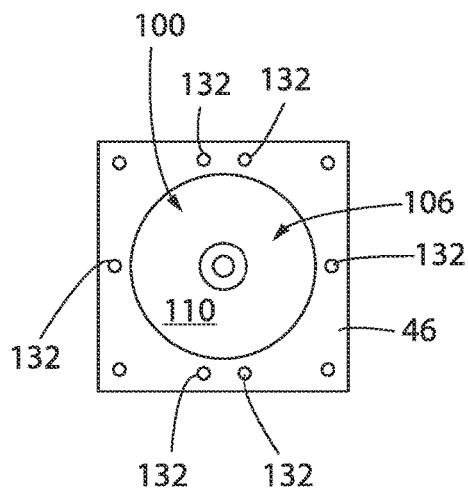
FIGS. 14-19 are various view of a bottom housing of the filter assembly shown in FIGS. 1-6.
Figure 15:
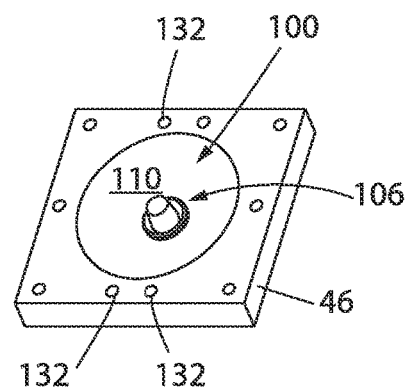
Figure 16:
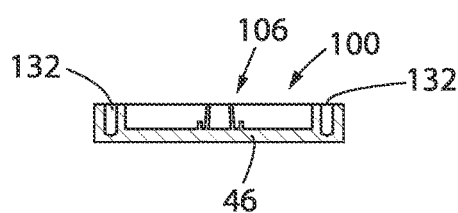
Figure 17:
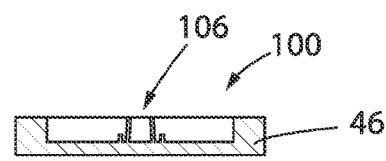
Figure 18:
Figure 19:
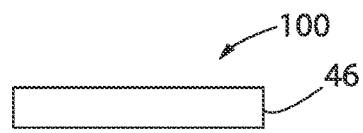
Figure 20:
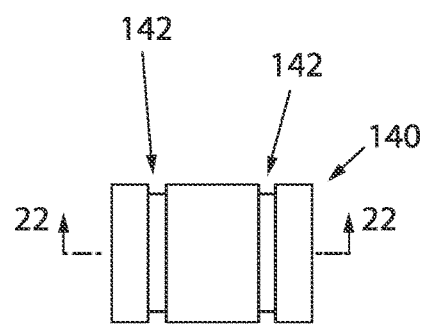
FIGS. 20-23 are various views of the housing connectors shown in FIG. 1 removed from the top housing shown therein.
Figure 21:
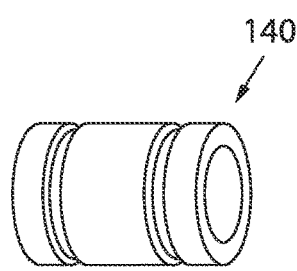
Figure 22:
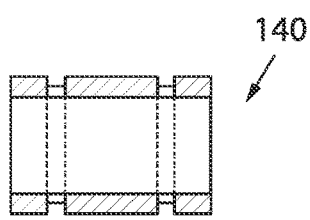
Figure 23:
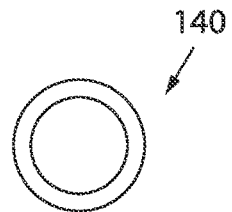

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents which operate in a similar manner to accomplish a similar purpose. For example, the words connected, secured, attached or terms similar thereto are often used. They are not limited to direct connection unless otherwise specified but include connection through other elements where such connection is recognized as being equivalent by those skilled in the art.

DETAILED DESCRIPTION OF THE PREFERRED EMBODIMENT

FIGS. 1-6 show various views of a filter assembly 40 according to the present invention. Each filter assembly 40 includes a head or top portion 42, a filter tube 44, and a base or bottom portion 46. Top portion 42, filter tube 44, and bottom portion 46 are shaped to cooperate with one another in a sealing manner so as to sealing capture a filter 48 generally therebetween. A cap, bung, or lid 50 removably cooperates with a threaded cavity 52 defined by top portion 42 and allows a discrete filter 48 associated with a respective filter assembly 40 to be removed, serviced, replaced with a similar or dissimilar filter. It is appreciated that the construction and operation of filters 48 can be provided in various modalities associated with the materials, elements, chemicals, and/or organisms they are configured to remove from a flow of fluid through a respective filter assembly or filtration system defined by a plurality of filter assemblies that are fluidly connected to one another.

Referring to FIGS. 1-13, a tube facing surface 60 of top portion 52 of filter assembly 40 includes a cavity 62 that is configured to slideably and sealingly cooperate with a first distal end 64 of filter tube 44. Head portion 52 defines one or more fluid inlets 70, 72, 74 and one or more fluid outlets 76, 78, 80 that each extend or are otherwise accessible from a generally outward radial direction, indicated by arrows 82, relative to a body 84 of head portion 42. Preferably, at least two of inlets 70, 72, 74 and at least two of outlets 76, 78, 80 defined by top portion 42 of each filter assembly 40 are oriented on generally adjacent respective lateral sides 86, 88, 90, 92 of head portion 42 so as to be oriented in a generally transverse direction relative to opening 52 and cavity 62 defined thereby.

Referring to FIGS. 2-6 and 14-19, bottom portion 46 of filter assembly 40 includes a cavity 100 that is shaped to slideably and sealingly cooperate with a second distal end 102 of filter tube 44. A filter tube facing surface of bottom portion 46 of each filter assembly 40 includes a hub 106 that extends in a generally upward axial direction, indicated by arrow 108, relative to a fluid facing surface 110 of bottom portion 46. Hub 106 is shaped to slideably cooperate with a radially interior facing surface 112 of a discrete filter 48 disposed within filter tube 44. A flow of fluid directed through each respective filter assembly 40 is directed to flow axially, as indicated by arrows 120 between a center cavity 122 defined by a discrete filter 48 and an outward oriented radial cavity 124 formed between an exterior surface of each discrete filter 48 and an interior wall 126 defined by each discrete filter tube 44 as the fluid flow passes from a respective inlet 70, 72, 74 toward a respective outlet 76, 78, 80 associated with a discrete filter assembly 40.

Referring to FIGS. 1-19, each respective top portion 42 and respective bottom portion 46 of each respective filter assembly 40 includes a plurality of openings 130, 132 that are disposed in a spaced association circumferentially about the respective opening 62, 100 associated with cooperating with filter tube 44 as disclosed further below. Respective fasteners 134 threadingly cooperate with respective openings 130, 132 defined by each respective top portion 42 and respective bottom portion 44 to effectuate a secure and fluidly sealed interaction between each respective filter tube 44 and a corresponding respective top portion 42 and respective bottom portion of each discrete filter assembly 40.

Referring to FIGS. 1 and 20-23, filter assembly 40 includes one or more connectors 140 that provide a sealed connection between a respective top portion 42 of a respective adjacent top portion 42 of an adjacent filter assembly 40 and a discrete one of inlets 70, 72, 74 and outlets 76, 78, and 80 associated therewith. As shown in FIGS. 20-23, each connector 140 includes a pair of respective grooves 142 that is shaped to cooperate with a seal, such as an O-ring or the like, and slideably cooperate with the respective opening defined by a desired one of inlets 70, 72, 74 and/or outlet 76, 78, 80 associated with adjacent fluidly connected filter assemblies 40. It should be appreciated that each of connectors 140 are shaped to provide a sealed interaction with a respective top portion 42 via translation of the respective connector 140, and the respective seal associated therewith, in an axial direction aligned with the discrete inlet/outlet passage 70, 72, 74, 76, 78, 80 associated with the relative adjacent top portions 42 with which it is engaged to effectuate the desired fluid connectivity therebetween.

Figure 24:
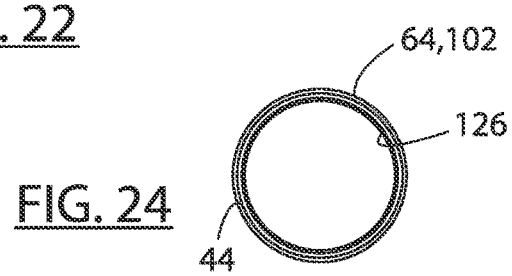
FIGS. 24 and 25 are various views of the filter tube housing removed from the filter assembly shown in FIGS. 1-6.
Figure 25:
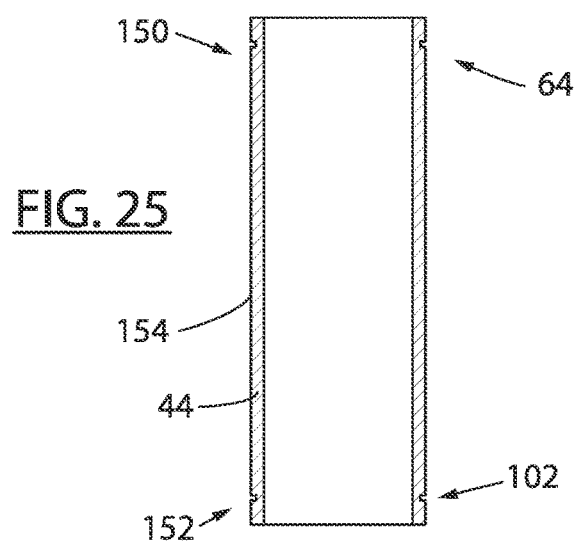

Referring to FIGS. 24-25, filter tube 44 includes one or more grooves 150 that extend in a circumferential manner about an exterior surface 152 of each respective filter tube 44 and are disposed proximate a respective opposite distal end 64, 102 thereof. As disclosed further below, grooves 150, 152 are shaped to slideably cooperate with a respective clamp plate 160 (FIGS. 26, 27) associated with securing the respective distal ends 64, 102 of filter tube 44 relative to a respective head portion 40 or respective base portion 46 associated with a respective filter assembly 40. As shown in FIGS. 26 and 27, each clamp plate 160 has a generally arcuate shaped exterior surface 162, a generally arcuate interior shaped surface 164, and one or more openings 165 formed therein. Interior facing arcuate surface 164 of each clamp plate 160 is shaped to slideably cooperate with a respective groove 150, 152 associated with a respective filter tube 44 such that the discrete clamp plates 160 can effectuate a compressive force between the respective filter tubes 44 and the adjacent respective one of a top portion 42 and a bottom portion 46 upon assembly of filter assembly 40.

FIGS. 28-31 are various views of a respective exemplary upper connection plate 170 and a respective lower connection plate 172 associated with providing a filtration system configured to support a plurality of filter assemblies 40. Referring to FIG. 28, it should be appreciated that the embodiment shown therein includes a plurality of discrete passages 174 wherein each passage is shaped to be slideably disposed proximate a lid 50 of a respective filter assembly 40. Preferably, upper connection plate 170 is constructed so as to not interfere with the removable operation associated with lid 50. Alternatively, passages 174 can be configured to slideably cooperate with filter tube 44 associated with each respective filter assembly 40.

Understandably, it is appreciated that upper connection plate 170 can be provided with other numbers of passages 174 such that the resultant filtration assembly can include a plurality of discrete filter assemblies 40 and can be provided in alternate configurations suitable to provide the desired degree of filtration associated with the fluid passed through a respective association of a plurality of discrete filter assemblies 40. As disclosed further below, upper connection plate 170 includes a number of passages 178 that are constructed to cooperate with respective fasteners configured to engage discrete threaded openings 180 (FIGS. 1 and 4) associated with the upwardly directed surface of each respective top portion 42 of each respective filter assembly 40.

Figures 30, 31:
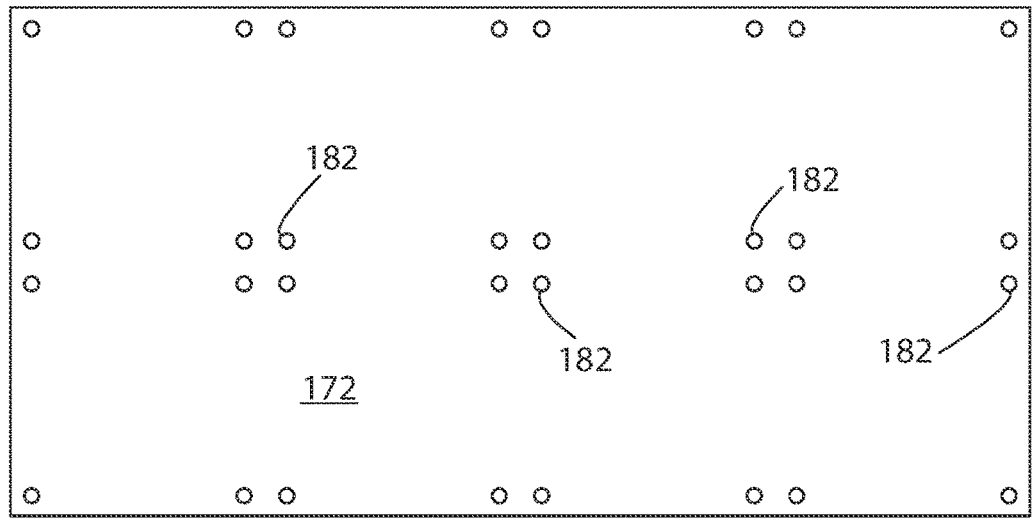
FIGS. 30 and 31 are various views of a lower mount plate that removably cooperates with a plurality of filter assemblies shown in FIGS. 1-6.
Figure 32:
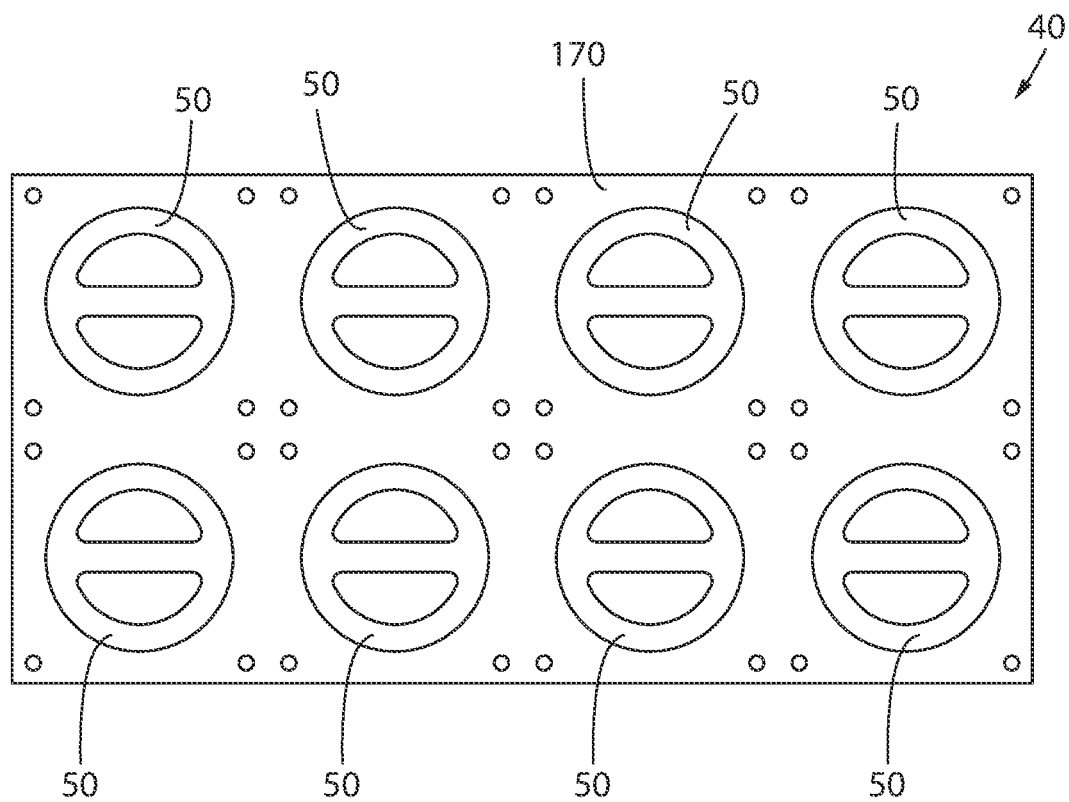
FIGS. 32-38 are various views of an exemplary filtration system that is defined by a plurality of filter assemblies shown in FIGS. 1-6 that are fluidly connected to one another.
Figure 33:
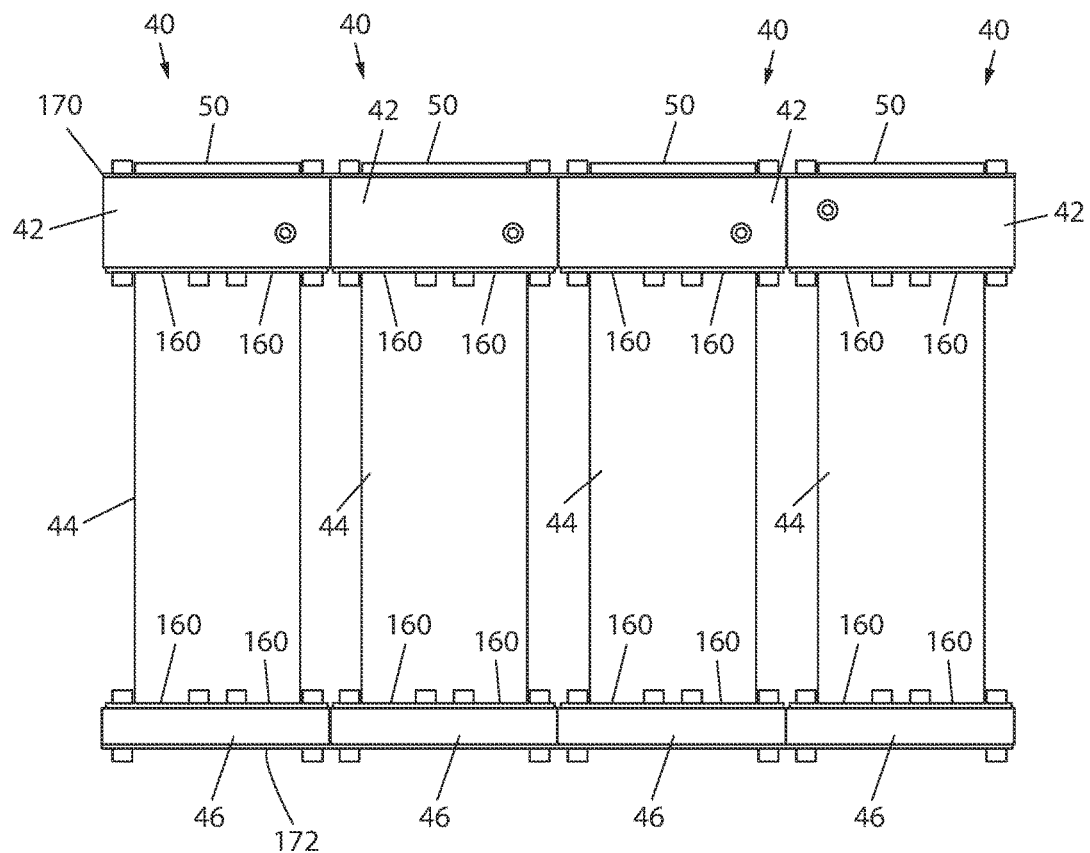
Figure 34:
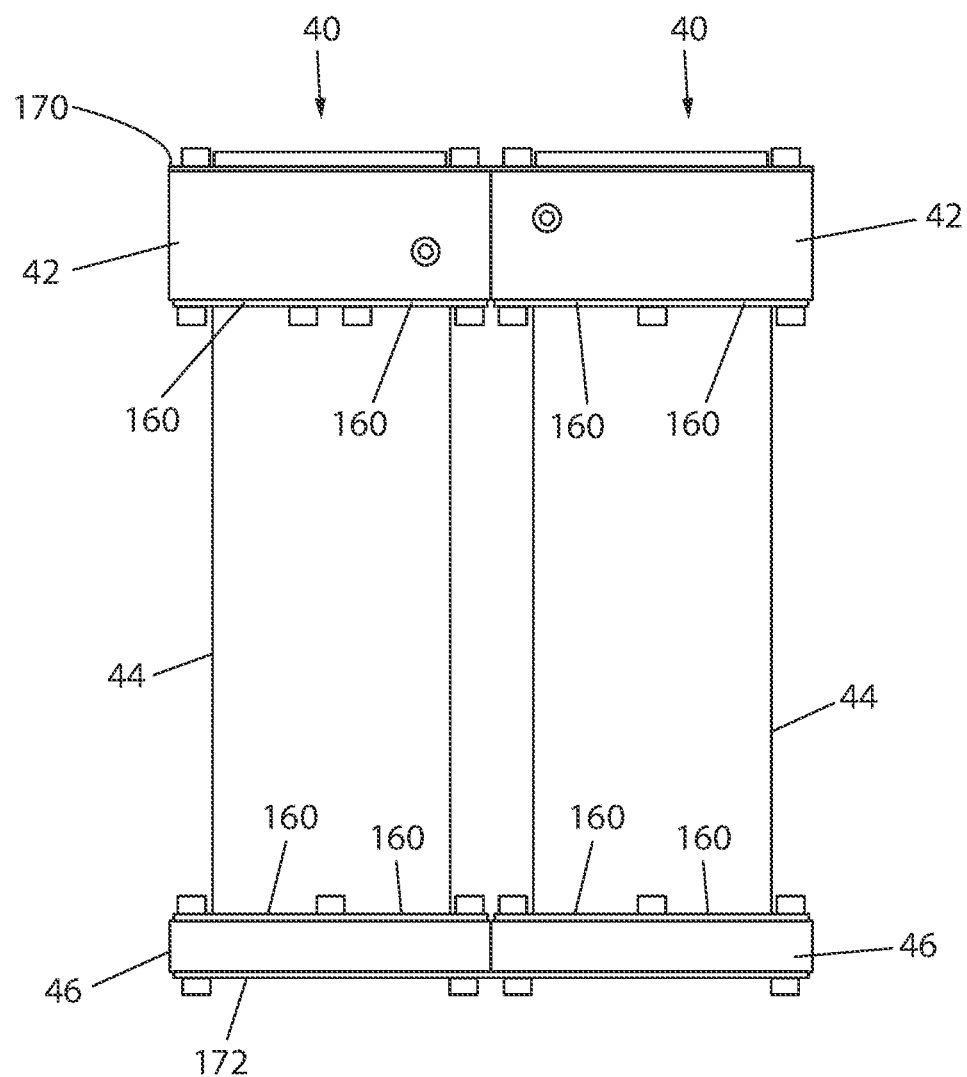

Referring to FIGS. 30 and 31, lower connection or support plate 172 includes a number of openings 182 which are also dispersed about the surface defined by plate 172. Openings 182 are constructed ad oriented to engage the generally downward directed surface associated with respective bottom portions 46 of discrete filter assemblies 40. It is appreciated that alternate configurations of upper and lower plates 170, 172 are envisioned so as provide filtration systems having alternate numbers of discrete filter assemblies 40.

Referring to FIGS. 31-38, when assembled, the filtration system can provide any number of a plurality of discrete filter assemblies 40 and is shown in an exemplary embodiment of eight (8) discrete filter assemblies 40 that are fluidly connected to one another. Each filter assembly 40 is supported between upper plate 170 and lower plate 172 which are secured to each respective top portion 42 and lower portion 46 associated with each filter assembly 40. A respective pair of clamp plates 160 is engaged with a respective portion of a respective one of grooves 150, 152 associated with each respective filter tube 44 and secured to a respective one of top portion 42 and lower portion 46 of a respective filter assembly 40. Respective pairs of clamp plates 160 maintain a desired sealed and structurally robust connection between each respective base portion 46 and respective filter tube 44 and each respective filter tube 44 and respective top portion 44.

Figure 35:
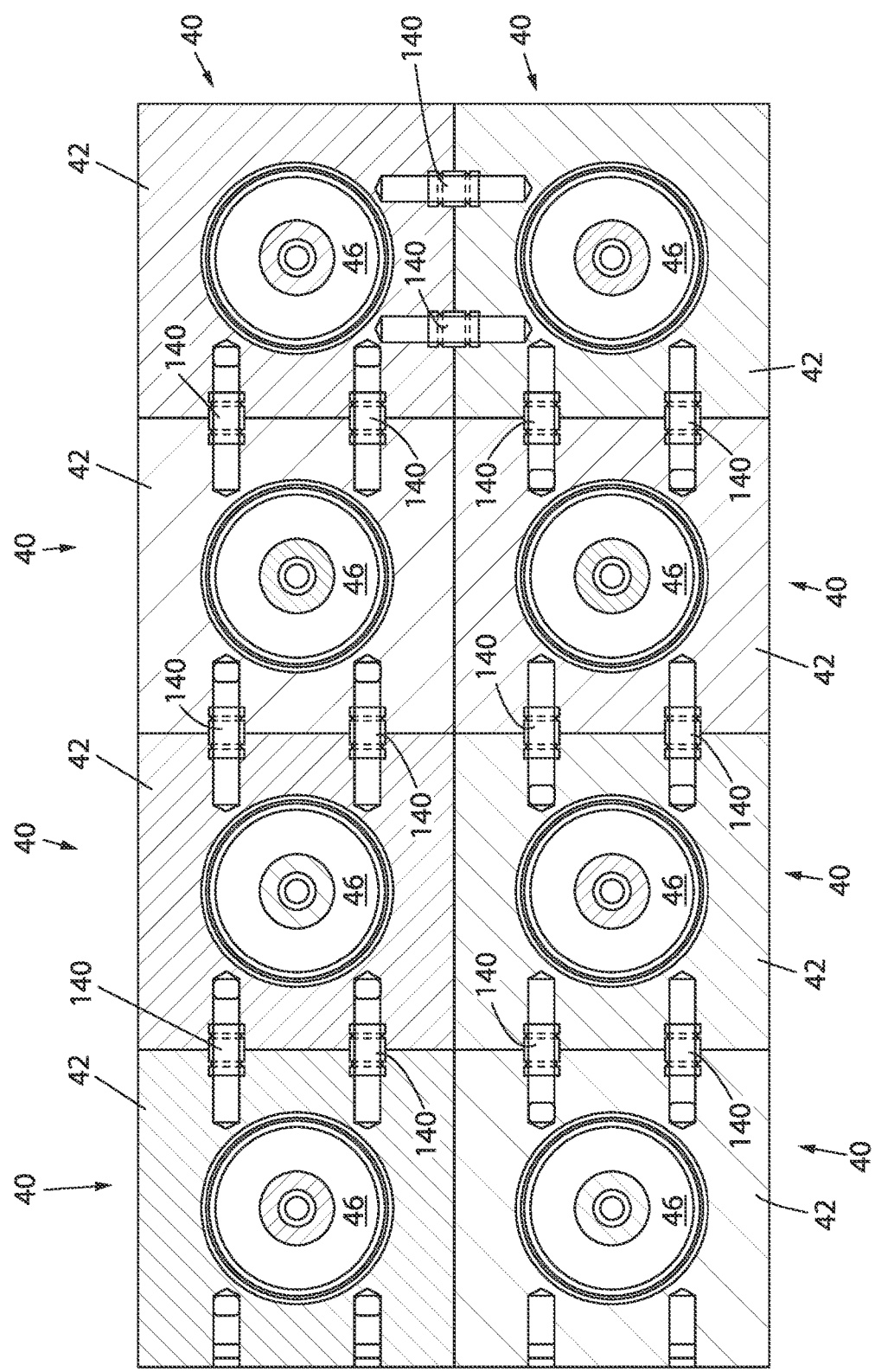
Figure 36:
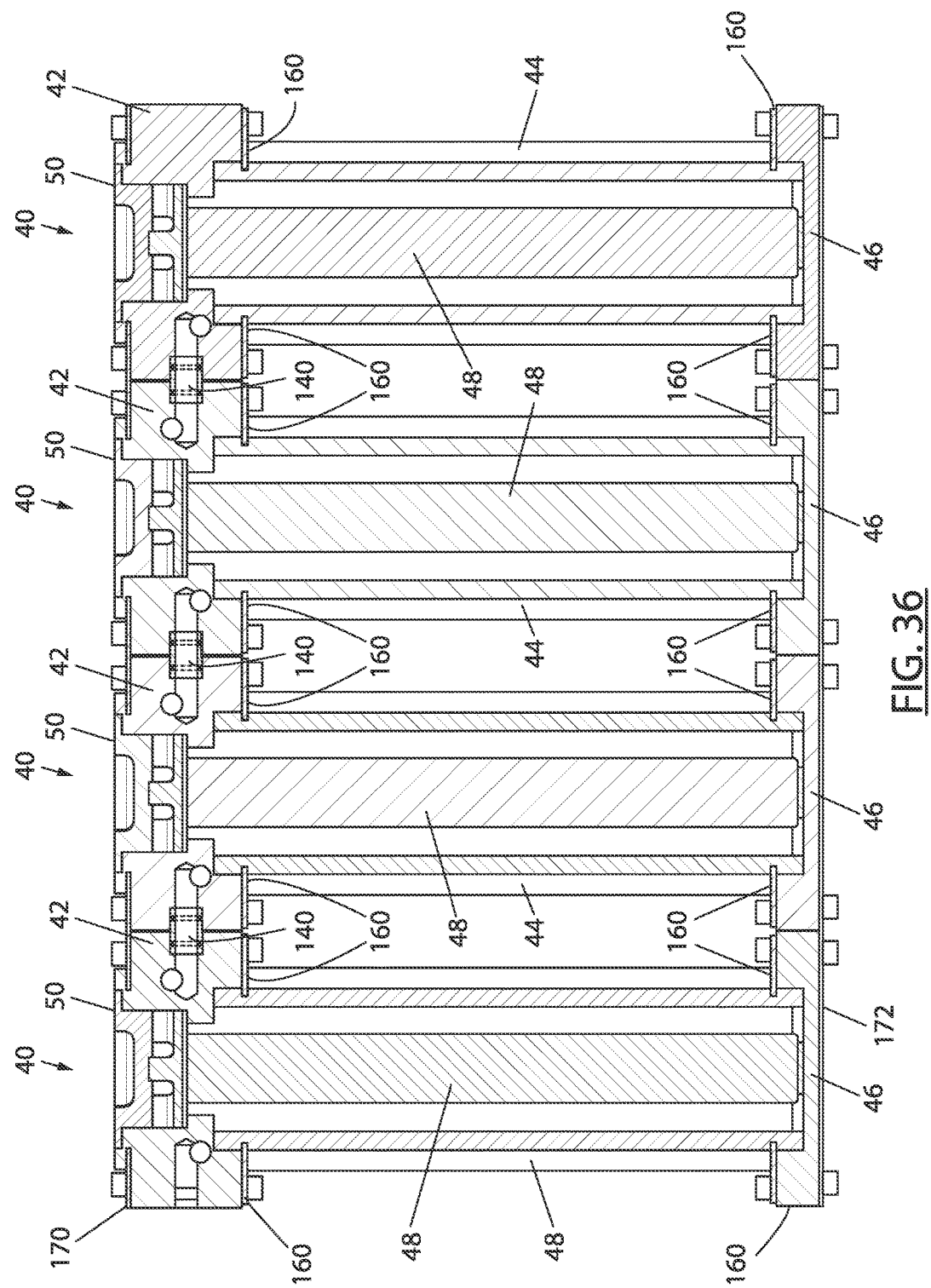
Figure 37:
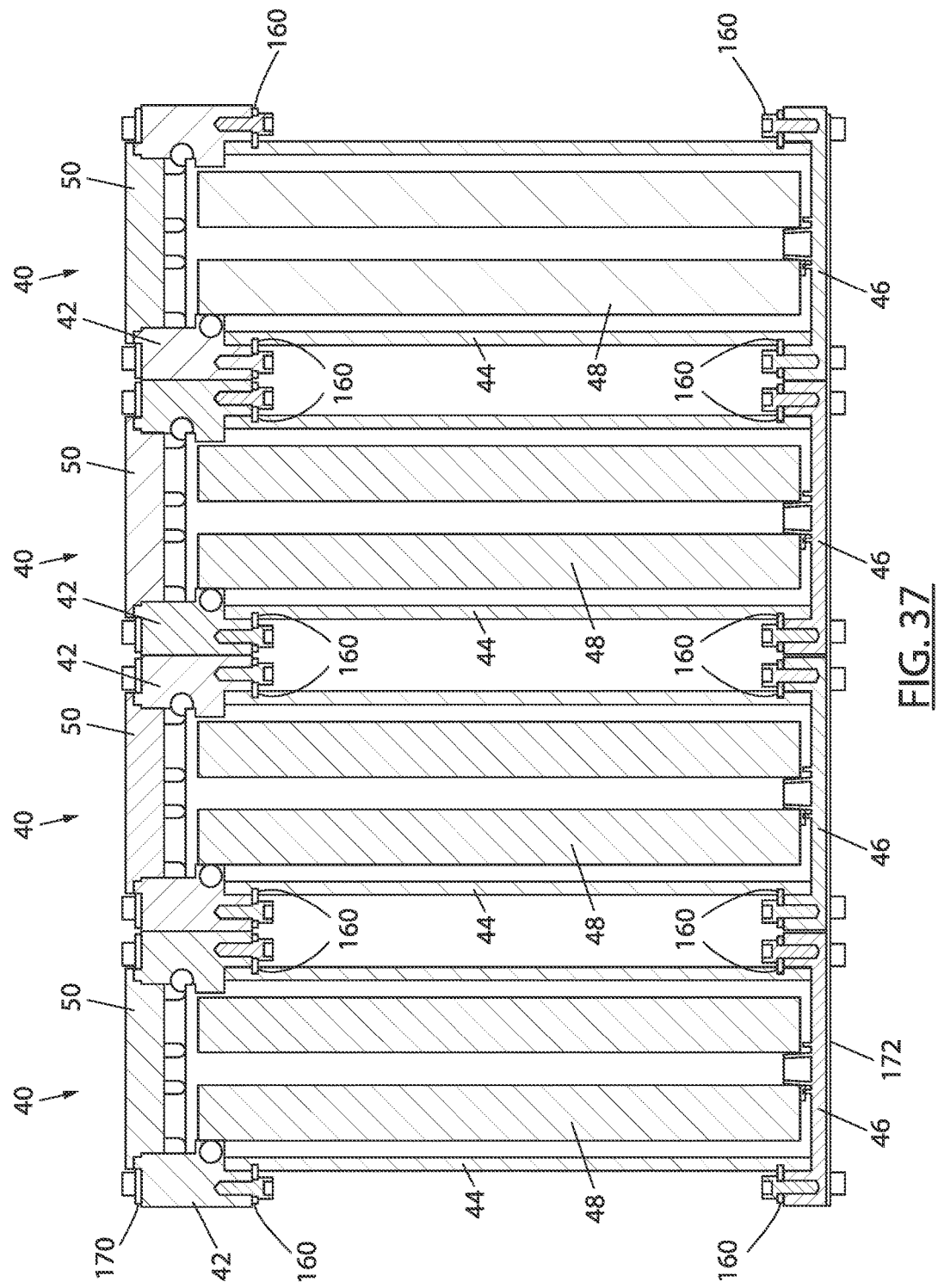
Figure 38:
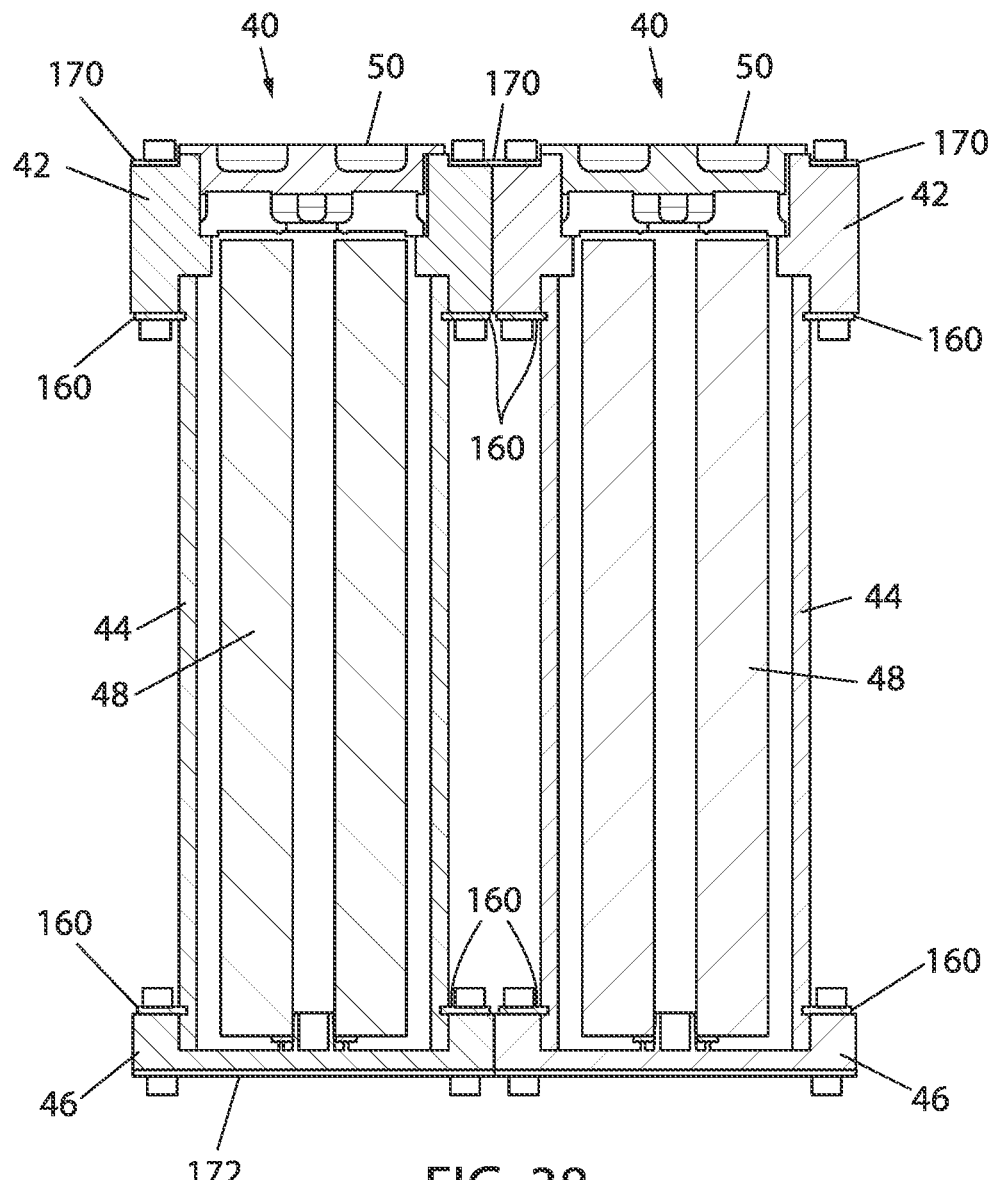

Respective connectors 140 are disposed between respective inlets and outlets of respective adjacent upper portions 42 of respective filter assemblies 40 so as to maintain sealed fluid connectivity between adjacent fluidly connected filter assemblies. As shown in FIG. 35, it should be appreciated that only selected ones of discrete filter assemblies 40 are fluidly connected to one another whereas other filter assemblies 40, even though being physically adjacent to one another, are only fluidly connected to other discrete filter assemblies 40 via intermediary filter assemblies 40. Such a consideration provides a compact form factor of the filtration system while providing the desired fluid filtration of the fluid flow directed therethrough. As indicated by the left most filter assemblies 40 shown in the configuration depicted in FIG. 35, the discrete "upper" and "lower" oriented filter assemblies 40 have discrete fluid flow passages, indicated by connectors 140, that are oriented in crossing directions relative to one another. Such a consideration allows the filtration system to be provided in various configurations suitable to the intended application or use thereof.

During assembly of a filtration system having a plurality of discrete fluid filter assemblies, it is appreciated that a number of discrete inlets 70, 72, 74 and outlets 76, 78, 80 may be rendered unusable or undesirably fluidly exposed to atmosphere. It is appreciated that one or more of inlets and or outlets whose utilization is undesired for a particular application, may be plugged or otherwise sealed from exposure to atmosphere or otherwise fluidly isolated from providing fluid flow connectivity beyond a respective top portion 42. Providing such ports even though the same may be undesired for some applications increases the functionality and ability to uniquely configure a desired filtration system from a limited number of parts associated with forming each discrete filter assembly. Such a consideration further allows the reconfiguration of an existing filter assembly to provide a desired degree of filtration should any of the circumstances associated with the incoming flow or the desired characteristics of the discharge flow change during the serviceable life of the resultant filter assembly.

Therefore, in accordance with one embodiment of the application, a modular fluid filtration or filter system or assembly includes at least one fluid filter assembly that is defined by a head portion, a base portion, and a filter tube housing that is captured between a respective head portion and respective base portion. Each head portion includes more than one fluid inlet and more than one fluid outlet that are discretely oriented relative to the respective head portion such that a plurality of fluid filter assemblies can be fluidly connected to one another to provide a desired degree of filtration of fluid passed through the filter assembly and such that the fluid filter assemblies can be oriented in a plurality of orientations relative to one another to provide a desired resultant configuration of the fluid filter assembly of fluid filtration system.

Another embodiment of the application includes a filter assembly that includes a base, a filter tube housing, and a top housing. The filter tube housing has a lower end that is sealingly engaged with the base and an upper end that is offset from the first end and cooperates with the top housing. The top housing sealingly cooperates with the upper end of the filter tube housing and defines a first fluid inlet, a second fluid inlet, a first fluid outlet, and a second fluid outlet. The first fluid inlet, the second fluid inlet, the first fluid outlet, and the second fluid outlet are oriented to be selectively fluidly connected to a respective one of a first fluid inlet, a second fluid inlet, a first fluid outlet, and a second fluid outlet defined by another top housing connected to the filter assembly such that multiple fluid filter assemblies can be connected to one another in more than one configuration and effectuate gradual filtering of the fluid passed therethrough.

Another embodiment of the application includes a filter assembly that includes a first filter housing assembly that includes a head portion, a base portion, and a tube housing that is disposed between the head portion and the base portion. A second filter housing assembly having the same construction as the first filter housing assembly is connectable to the first filter housing to effectuate fluid connectivity between a head portion of the second filter housing assembly and the head portion of the first filter housing assembly at more than one orientation of the first head portion relative to the second head portion.

A further embodiment of the application includes a method of forming a fluid filter assembly. The method includes providing a filter housing assembly that defines a filter chamber and includes at least two fluid inlets and at least two fluid outlets. A mount plate is provided and constructed to secure a plurality of the filter housing assemblies relative to one another in a manner that directs a flow of a fluid through the filter housing assemblies when the filter housing assemblies are connected to one another in more than one relative position.

It is specifically intended that the present invention not be limited to the embodiments and illustrations contained herein, but include modified forms of those embodiments including portions of the embodiments and combinations of elements of different embodiments as come within the scope of the following claims.

We claim:

1. A filter assembly comprising:
    a base;
    a filter tube housing having a lower end that is sealingly engaged with the base and an upper end that is offset from the first end;
    a top housing that sealingly cooperates with the upper end of the filter tube housing, the top housing defining a first fluid inlet and a second fluid inlet and a first fluid outlet and a second fluid outlet wherein the first fluid inlet, the second fluid inlet, the first fluid outlet, and the second fluid outlet are oriented to be selectively fluidly connected to a respective one of a first fluid inlet, a second fluid inlet, a first fluid outlet, and a second fluid outlet defined by another top housing connected to the filter assembly.

2. The filter assembly of claim 1 wherein the respective first fluid inlet and the second fluid inlet are oriented on generally adjacent sides of the top housing.

3. The filter assembly of claim 1 further comprising a bung associated with an opening formed in the top housing.

4. The filter assembly of claim 3 further comprising a seal disposed in the opening formed in the top housing and shaped to engage the bung.

5. The filter assembly of claim 1 wherein the filter tube includes a first groove disposed proximate the lower end and a second groove disposed proximate the upper end of the filter tube housing.

6. The filter assembly of claim 5 further comprising a collar configured to engage one of the first groove and the second groove in a radial direction relative to a longitudinal axis of the filter tube housing.

7. The filter assembly of claim 6 further comprising a fastener that passes through the collar and threadingly engages one of the base and the top housing.

8. The filter assembly of claim 1 further comprising a filter disposed in the filter tube and captured in an axial direction between an interior facing surface of the base and an interior facing surface of the top housing.

9. The filter assembly of claim 1 further comprising a mount plate that is shaped to cooperate with each of the top housing and another top housing.

10. A filter assembly comprising:
    a first filter housing assembly having a head portion, a base portion, and a tube housing disposed between the head portion and the base portion; and
    a second filter housing assembly having the same construction as the first filter housing assembly and connectable thereto to effectuate fluid connectivity between a head portion of the second filter housing assembly and the head portion of the first filter housing assembly at more than one orientation of the first head portion relative to the second head portion.

11. The filter assembly of claim 10 further comprising a filter disposed in each tube housing.

12. The filter assembly of claim 10 further comprising a cap plug that removably cooperates with each head portion of the first filter housing assembly and the second filter housing assembly.

13. The filter assembly of claim 12 further comprising a seal disposed between the cap plug and a respective head portion.

14. The filter assembly of claim 12 wherein each head portion includes a plurality of fluid inlets and a plurality of fluid outlets that are oriented on respective adjacent sides of the respective head portion.

15. The filter assembly of claim 12 further comprising a first mount plate constructed to engage each head portion of the filter assembly and a second mount plate constructed to engage each base portion of the filter assembly.

16. The filter assembly of claim 15 further comprising a collar that engages the tube housing and is securable to one of a respective head portion and a respective base portion of a respective one of the first filter housing assembly and the second filter housing assembly.

17. A method of forming a fluid filter assembly, the method comprising:
    providing a filter housing assembly that defines a filter chamber and includes at least two fluid inlets and at least two fluid outlets;
    providing a mount plate that is constructed to secure a plurality of the filter housing assemblies relative to one another in a manner that directs a flow of a fluid through the filter housing assemblies when the filter housing assemblies are oriented in more than one position relative to one another.

18. The method of 17 further comprising providing a bung that removably cooperates with each filter housing assembly and exposes the filter chamber when removed therefrom.

19. The method of claim 17 wherein providing each filter housing assembly includes providing a head portion that defines each of the at least two fluid inlets and at least two fluid outlets, providing a base portion, and providing a tube housing that is disposed between a respective head portion and a respective base portion.

20. The method of claim 19 further comprising forming a plurality of grooves in an exterior surface of each filter chamber and providing a plurality of collars that each have an arcuate shape and are shaped to cooperate with a respective portion of a respective groove and are securable to one of a respective head portion and a respective base portion to secure a respective filter chamber relative thereto.

\* \* \* \* \*